US011909330B2

(12) United States Patent
Shen et al.

(10) Patent No.: US 11,909,330 B2
(45) Date of Patent: Feb. 20, 2024

(54) CURRENT CONTROL DEVICE AND POWER CONVERSION SYSTEM EMPLOYING SAME

(71) Applicant: Delta Electronics (Shanghai) Co., Ltd., Shanghai (CN)

(72) Inventors: Guoqiao Shen, Shanghai (CN); Guojin Xu, Shanghai (CN); Ning He, Shanghai (CN); Daidong Pan, Shanghai (CN)

(73) Assignee: DELTA ELECTRONICS (SHANGHAI) CO., LTD., Shanghai (CN)

( * ) Notice: Subject to any disclaimer, the term of this patent is extended or adjusted under 35 U.S.C. 154(b) by 199 days.

(21) Appl. No.: 17/500,519

(22) Filed: Oct. 13, 2021

(65) Prior Publication Data

US 2022/0224246 A1 Jul. 14, 2022

(30) Foreign Application Priority Data

Jan. 11, 2021 (CN) .......................... 202110030390.7

(51) Int. Cl.
*H02M 7/538* (2007.01)
*H02M 1/32* (2007.01)
*G05F 1/56* (2006.01)

(52) U.S. Cl.
CPC .............. *H02M 7/538* (2013.01); *G05F 1/56* (2013.01); *H02M 1/32* (2013.01)

(58) Field of Classification Search
CPC .. G05F 1/56; G05F 1/563; G05F 1/54; H02M 7/358; H02M 7/53803; H02M 7/5381;
(Continued)

(56) References Cited

U.S. PATENT DOCUMENTS

2005/0187752 A1* 8/2005 Colby ............... H02M 7/53806
703/19
2010/0079102 A1* 4/2010 Servidone ................. H02P 8/32
318/685
(Continued)

FOREIGN PATENT DOCUMENTS

CN 203012569 U 6/2013
CN 106026636 A 10/2016
(Continued)

*Primary Examiner* — Nguyen Tran
(74) *Attorney, Agent, or Firm* — KIRTON McCONKIE; Evan R. Witt

(57) ABSTRACT

A current control device and a power conversion system employing the current control device are provided. The current control device controls N power conversion unit(s), where N is a positive integer. The N power conversion units are connected in parallel when N is greater than 1. Each power conversion unit includes a signal input terminal and a current-controlled output terminal electrically connected to an external circuit. The current control device includes a first current sensor and an error compensator. The first current sensor samples a current flowing through the external circuit and acquires a sampling value. The error compensator receives the sampling value and a reference value and generates a compensation value accordingly, and outputs N current command(s) to the N power conversion unit(s) respectively according to the reference value and the compensation value.

18 Claims, 7 Drawing Sheets

(58) Field of Classification Search
CPC . H02M 7/53835; H02M 7/53846; H02M 1/32
See application file for complete search history.

(56) References Cited

U.S. PATENT DOCUMENTS

2010/0301826 A1* 12/2010 Moussaoui ......... H02M 3/1584
323/285
2015/0270787 A1* 9/2015 Fujisaki ................ H02M 3/158
363/41

FOREIGN PATENT DOCUMENTS

| | | |
|---|---|---|
| CN | 106655182 A | 5/2017 |
| CN | 108459645 A | 8/2018 |
| CN | 105223533 B | 1/2019 |
| CN | 110635735 A | 12/2019 |
| CN | 111130350 A | 5/2020 |
| JP | 2002369541 A | 12/2002 |

* cited by examiner

CURRENT CONTROL DEVICE AND POWER CONVERSION SYSTEM EMPLOYING SAME

RELATED APPLICATION

This application claims priority to China Patent Application No. 202110030390.7, filed on Jan. 11, 2021, the entire contents of which are incorporated herein by reference for all purposes.

TECHNICAL FIELD

The present disclosure relates to a current control device and a power conversion system employing the current control device with high current control accuracy.

BACKGROUND

Nowadays, with the rapid development of electronic technology, the requirement for current control accuracy becomes higher and higher. Conventionally, in order to achieve high current control accuracy, an additional power circuit is required to generate a compensation current, and the compensation current must be synthesized with the original DC current to eliminate the error.

However, because the additional power circuit is an extra hardware, the overall circuit becomes more complex. Further, the additional power circuit cannot be installed and disassembled flexibly. Therefore, the power circuit can only be inherently disposed in a certain apparatus, and the power circuit is unable to be disposed in the existing product or system externally.

Therefore, there is a need to provide a current control device and a power conversion system employing the same in order to overcome the drawbacks of conventional technologies.

SUMMARY

The present disclosure provides a current control device and a power conversion system employing the current control device. A current sensor and an error compensator can be utilized to realize the error compensation control for the total current of one or more power conversion units. Consequently, high current control accuracy can be achieved with a low cost solution that takes up only a very small space.

In one aspect, the present disclosure provides a current control device configured to control N power conversion unit(s), where N is an integer greater than or equal to 1. The N power conversion units are connected in parallel when N is greater than 1. Each power conversion unit includes a signal input terminal and a current-controlled output terminal electrically connected to an external circuit. The external circuit can be a load or a power source. The current control device includes a first current sensor and an error compensator. The first current sensor is electrically connected between the current-controlled output terminal and the external circuit. The first current sensor is configured to sample a current flowing through the external circuit and acquire a current sampling value. The error compensator is electrically connected to the N power conversion unit(s) and the first current sensor. The error compensator receives the current sampling value and a reference current value and generates a compensation value accordingly. The error compensator outputs N current command(s) to the N power conversion unit(s) respectively according to the reference current value and the compensation value.

In another aspect, the present disclosure provides a power conversion system including a power grid, an inverter, N power conversion unit(s) connected to each other, and a current control device. N is an integer greater than or equal to 1. The N power conversion units are connected in parallel when N is greater than 1. Each power conversion unit includes a signal input terminal and a current-controlled output terminal electrically connected to an external circuit. The external circuit can be a load or a power source. The current control device is configured to provide current command(s) to the N power conversion unit(s) for controlling current(s) flowing through the N power conversion unit(s).

DETAILED DESCRIPTION

Embodiments of the present disclosure will be described in more detail with reference to the drawings. It is to be noted that the following detailed descriptions are presented for purpose of illustration and description only. It is not intended to be exhaustive or to be limited to the precise form disclosed.

Figure 1:
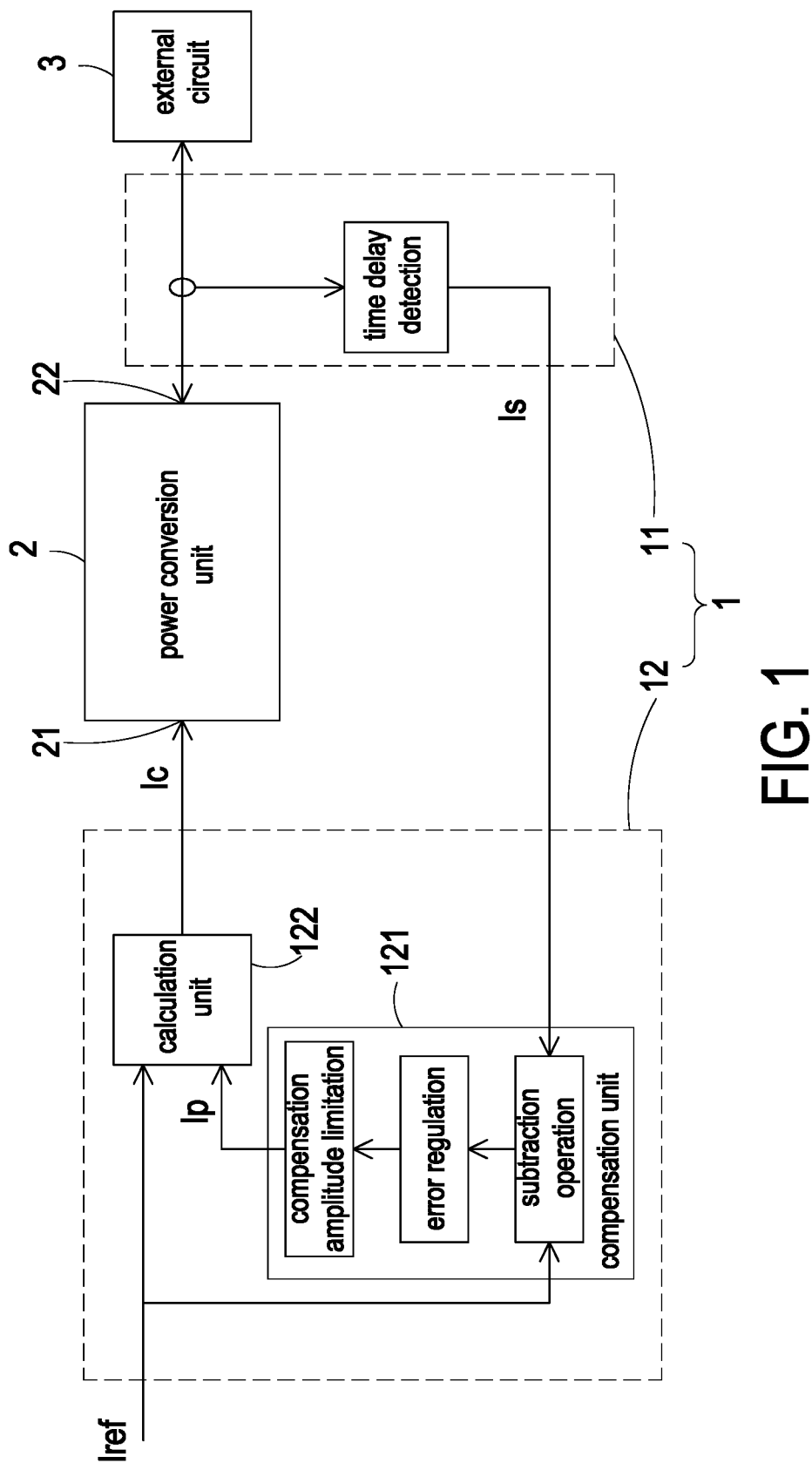
FIG. 1 and FIG. 2 are schematic circuit diagrams illustrating a current control device and a power conversion unit according to an embodiment of the present disclosure.
Figure 2:
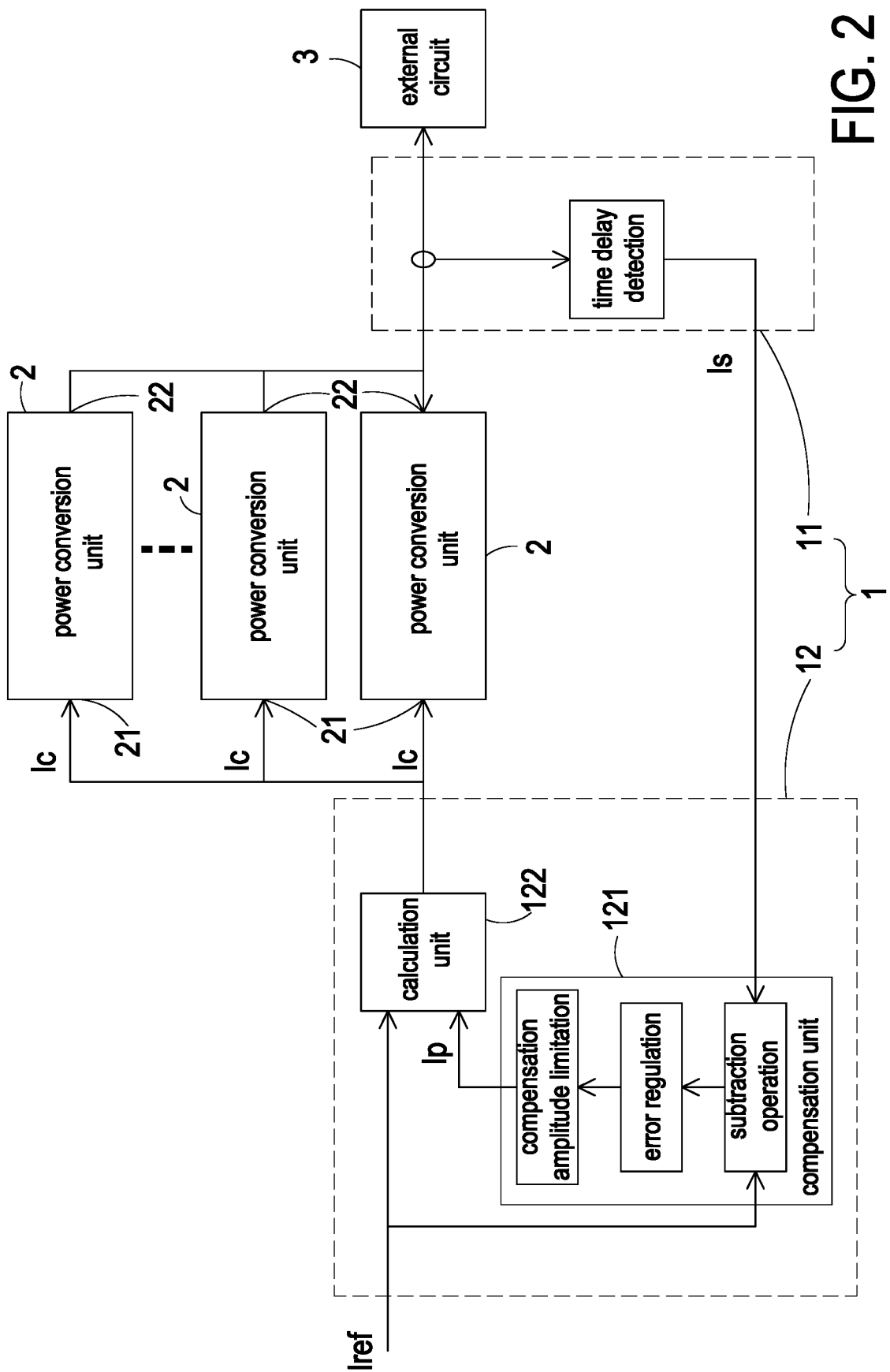

FIG. 1 and FIG. 2 are schematic circuit diagrams illustrating a current control device and a power conversion unit according to an embodiment of the present disclosure. As shown in FIG. 1 and FIG. 2, a current control device 1 is configured to control N power conversion unit(s) 2, where N is an integer greater than or equal to 1. The power conversion unit 2 can be, for example, but not limited to, a DC/DC converter, an AC/AC converter, or a DC/AC converter. FIG. 1 shows the implementation of N being equal to 1, and FIG. 2 shows the implementation of N being greater than 2. When N is greater than 1, the N power conversion units 2 can be connected in parallel. Each power conversion unit 2 includes a signal input terminal 21 and a current-controlled output terminal 22. The current-controlled output terminal 22 is electrically connected to an external circuit 3, which may be a load or a power source. The current flowing direction between the current-controlled output terminal 22 and the external circuit 3 is not limited. That is, the current-controlled output terminal 22 may output current to the external circuit 3 (when the external circuit 3 as a load), or the current-controlled output terminal 22 may receive current from the external circuit 3 (when the external circuit 3 as a power source).

The current control device 1 includes a first current sensor 11 and an error compensator error compensator 12. The first current sensor 11 is coupled (electrically or magnetically) between the current-controlled output terminal 22 and the external circuit 3. The first current sensor 11 is configured to sample the current flowing through the external circuit 3 and acquire a current sampling value Is. The first current sensor 11 has a high sampling accuracy, and the measurement error of the first current sensor 11 is preferably less than 0.5%, but not so limited. The error compensator 12 is electrically connected to all the power conversion units 2 and the first current sensor 11. The error compensator 12 receives the current sampling value Is and a current reference value Iref and generates a compensation value Ip according to the current sampling value Is and the current reference value Iref. Based on the current reference value Iref and the compensation value Ip, the error compensator 12 outputs N current command(s) Ic to the signal input terminal(s) 21 of the N power conversion unit(s) 2, respectively.

In the current control device 1 of the present disclosure, the error compensator 12 may be implemented as a software or firmware module, the operation of which corresponds to a computer algorithm. The error compensator 12 can be disposed or otherwise installed in a processing unit of the power conversion unit 2 or a separate controller, and the processing unit may execute the algorithm of the error compensator 12. Therefore, there is no need to additionally dispose hardware compensation circuits, and the occupied space volume and cost can be reduced. Accordingly, through the first current sensor 11 and the error compensator 12, the error compensation control for the total current of one or more power conversion unit(s) 2 can be realized. Consequently, the high current control accuracy can be achieved with low cost, and the occupied space volume is small.

In addition, when N is greater than 1, as shown in FIG. 2, the sum of the N current commands Ic is equal to the sum of the current reference value Iref and the compensation value Ip. In one embodiment, the N current commands Ic are equal. In another embodiment, the N current commands Ic are unequal, and each current command Ic can be adjusted individually according to the actual requirements.

In some embodiments, as shown in FIG. 1 and FIG. 2, the error compensator 12 includes a compensation unit 121 and a calculation unit 122. The compensation unit 121 generates the compensation value Ip according to the current sampling value Is and the current reference value Iref. The calculation unit 122 outputs the N current command(s) Ic to the N power conversion unit(s) 2 according to the current reference value Iref and the compensation value Ip. Specifically, the compensation unit 121 performs subtraction operation to the current sampling value Is and the current reference value Iref so as to acquire the current error (e.g., Ierror=Is−Iref). Then, the compensation unit 121 generates the compensation value Ip by regulating the current error with proportional, PI (proportion integration) or PID (proportion integration differentiation) algorithm and limiting the compensation amplitude to be a small part such as 10% of the rated value of the current through the external circuit. Afterwards, the calculation unit 122 adds the compensation value Ip to the current reference value Iref for acquiring a sum (e.g., Isum=Ip+Iref). The sum equals the current command Ic when N equals 1, and the calculation unit 122 divides the sum into the N current commands Ic when N is greater than 1. Preferably but not exclusively, the compensation value is not greater than 20% of the rated value of the current through the external circuit.

Figure 3:
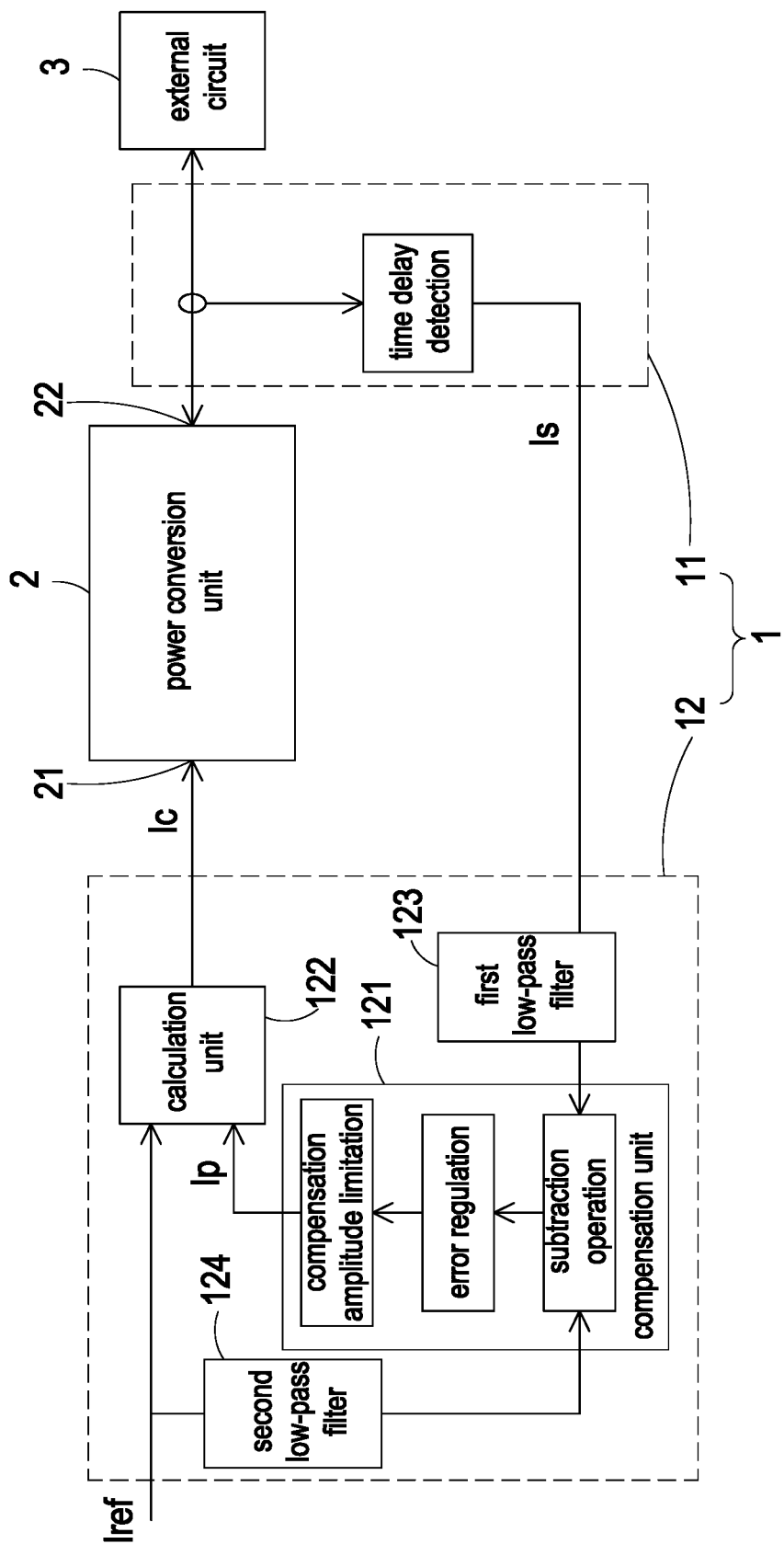
FIG. 3 and FIG. 4 are schematic circuit diagrams illustrating a current control device and a power conversion unit according to an embodiment of the present disclosure.
Figure 4:
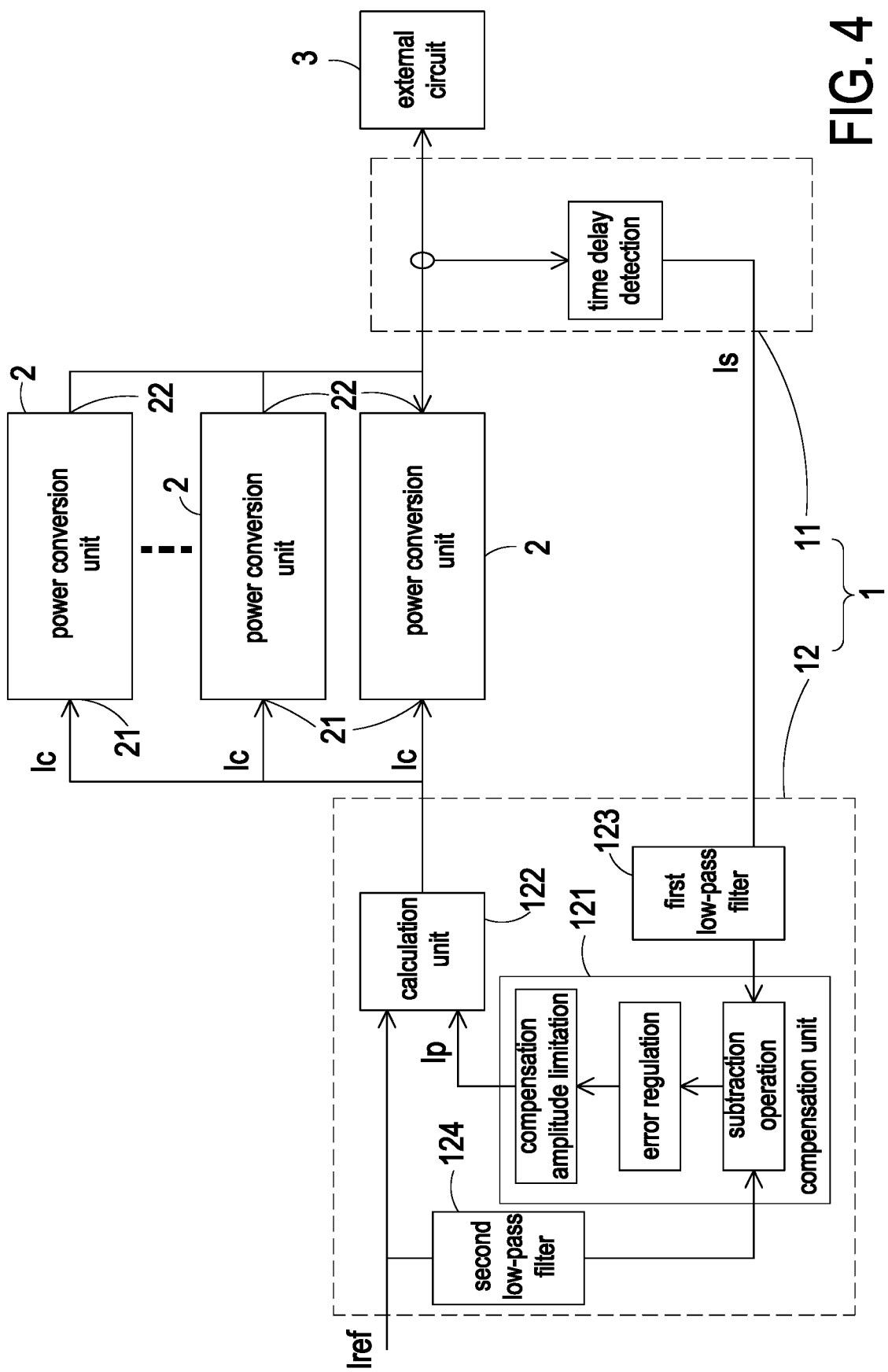

In some embodiments, as shown in FIG. 3 and FIG. 4, the error compensator 12 further includes a first low-pass filter 123 and a second low-pass filter 124. The first low-pass filter 123 is coupled between the first current sensor 11 and the compensation unit 121. The first low-pass filter 123 receives and filters the current sampling value Is, and outputs the filtered current sampling value Is to the compensation unit 121. The second low-pass filter 124 is coupled to the compensation unit 121. The second low-pass filter 124 receives and filters the current reference value Iref, and outputs the filtered current reference value Iref to the compensation unit 121. When the current sampling value Is fluctuates rapidly, the current sampling value Is received by the compensation unit 121 becomes more stable through the filtering of the first low-pass filter 123. In addition, the power conversion unit 2, the first current sensor 11 and the first low-pass filter 123 all have a time delay. As such, the second low-pass filter 124 is disposed, and the time delay of the second low-pass filter 124 is set to be equal to the sum of the time delays of the power conversion unit 2, the first current sensor 11, and the first low-pass filter 123. Consequently, the effect of time delay can be eliminated. Therefore, the current control becomes more accurate.

Figure 5:
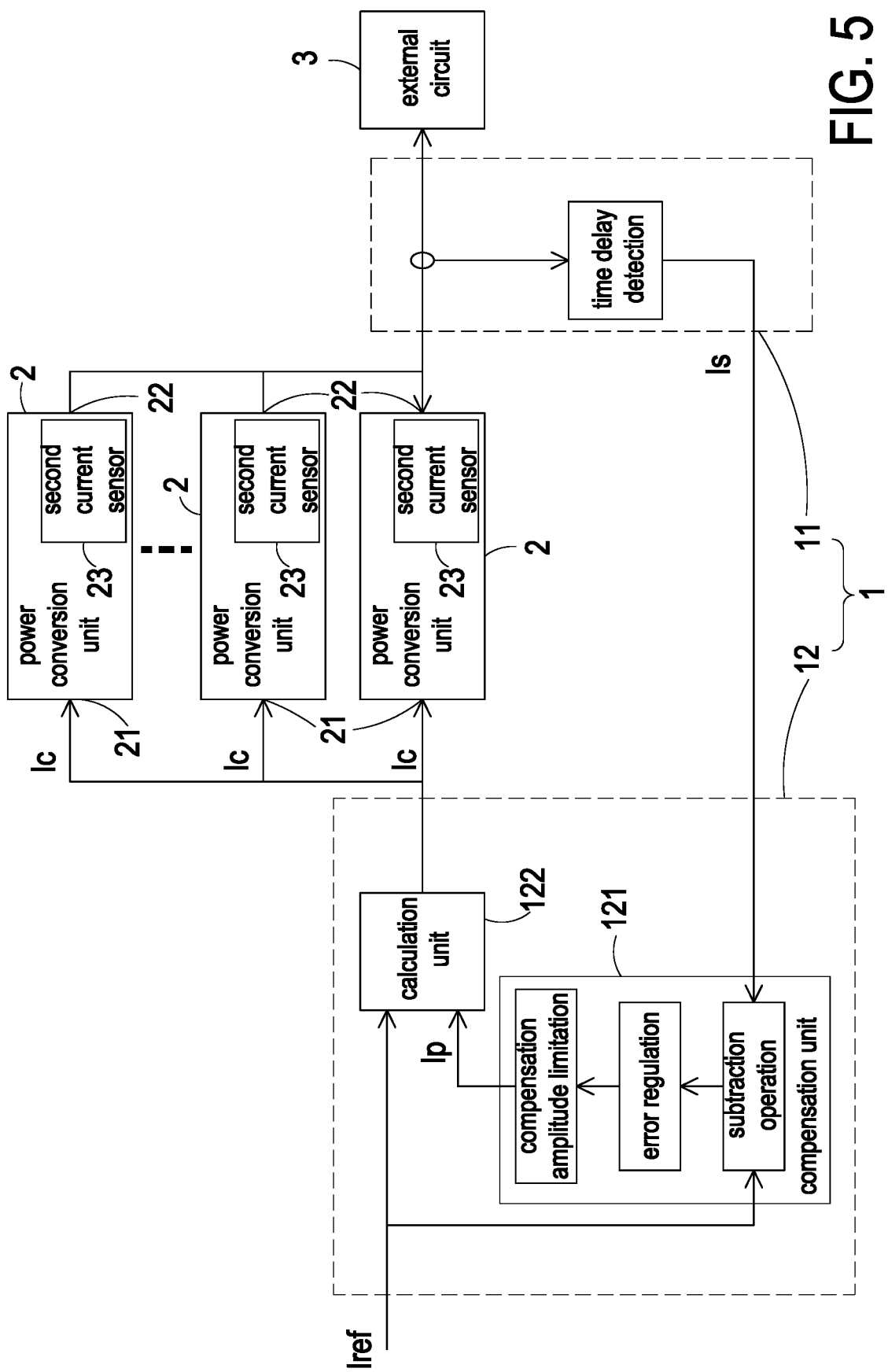
FIG. 5 is a schematic circuit diagram illustrating a current control device and power conversion units according to an embodiment of the present disclosure.

In some embodiments, as shown in FIG. 5, each power conversion unit 2 includes a second current sensor 23. Each second current sensor 23 is configured to detect the current flowing through its corresponding power conversion unit 2 (i.e., the power conversion unit 2 including this second current sensor 23). The sampling accuracy of the second current sensor 23 is lower than the sampling accuracy of the first current sensor 11. Of course, the power conversion unit 2 in other embodiments disclosed herein can include the second current sensor 23 shown in FIG. 5.

In some embodiments, the current control device may be employed in a power conversion system. For example, the power conversion system may include a power grid, an inverter, N power conversion unit(s) 2, a current control device, and an external circuit. The composition and operation of the current control device of the power conversion system are the same as that of the above-mentioned current control device, and thus the detailed descriptions thereof are omitted herein. The power grid, the inverter, and the N power conversion unit(s) 2 are connected with each other. The current control device 1 is configured to provide the current command for the N power conversion unit(s) 2 so as to control the current flowing through the N power conversion unit(s) 2.

Figure 6:
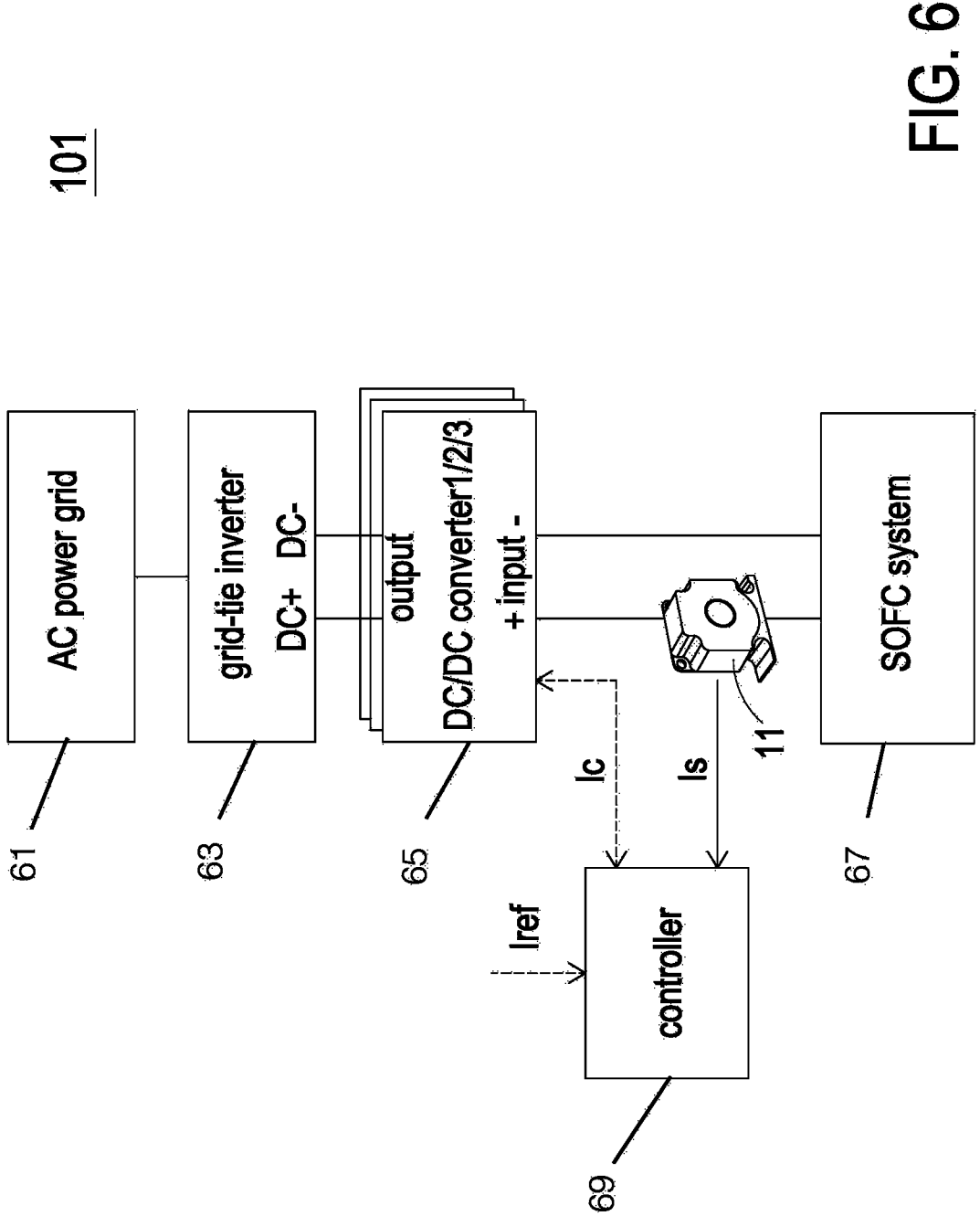
FIG. 6 and FIG. 7 are schematic block diagrams illustrating a power conversion system according to various embodiments of the present disclosure.
Figure 7:
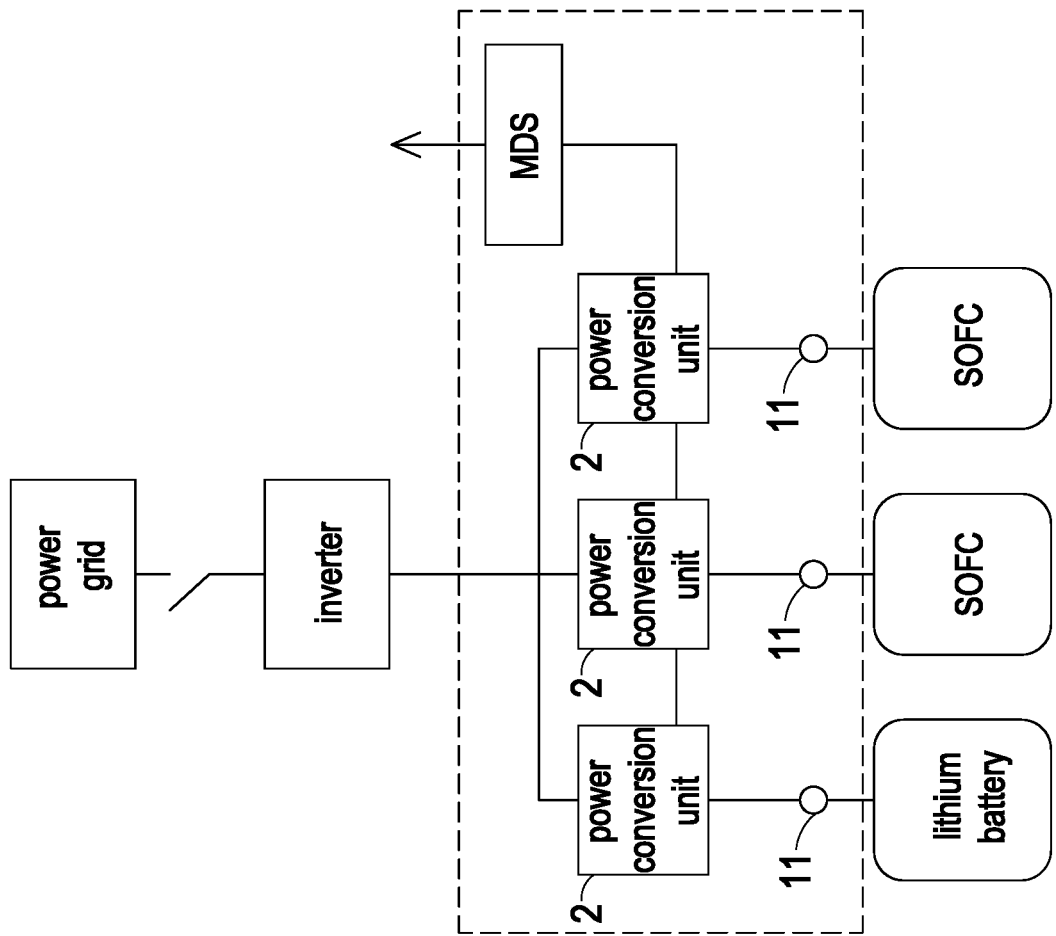

FIG. 6 and FIG. 7 schematically illustrate a power conversion system according to various embodiments of the present disclosure.

In one embodiment, as shown in FIG. 6, the power grid, the inverter, the power conversion unit and the external circuit of the power conversion system 101 are an AC power grid 61, a grid-tie inverter 63, DC/DC converters 65, and a SOFC (solid oxide fuel cell) system 67. The error compensator 12 of the current control device 1 (as shown in FIGS. 1-5) can be disposed in a controller 69 configured to control the DC/DC converter 65. As shown in FIG. 6, in this embodiment, three DC/DC converters 65 are connected in parallel to boost the low-voltage DC power outputted by the SOFC system, and the grid-tie inverter 63 converts the boosted DC power into an AC power and outputs the AC power to the AC power grid 61. The first current sensor 11 of the current control device 1 can be coupled (electrically or magnetically) to the parallelly-connected input terminal of the DC/DC converters for sampling current. According to the sampled current, the error compensator 12 in the controller 69 compensates the current error and provides the current commands Ic to the DC/DC converters 65. Consequently, high current control accuracy can be achieved.

In one embodiment, as shown in FIG. 7, the power conversion system 102 includes a power grid, an inverter, N power conversion unit(s) 2, N current control device(s), and N external circuit(s). The N external circuit(s) is/are respectively electrically connected to the N power conversion unit(s) 2. The N current control device(s) is/are respectively corresponding to the N power conversion unit(s) 2. The error compensator of each current control device can be disposed in the corresponding power conversion unit 2. The first current sensor 11 of each current control device is configured to detect the current flowing through the corresponding external circuit. The external circuit may be a power generator or a battery like lithium battery or SOFC.

In summary, the present disclosure provides a current control device and a power conversion system employing the same. The current sensor and the error compensator are utilized to realize the error compensation control for the total current of one or more power conversion unit(s). Consequently, the high current control accuracy can be achieved with low cost, and the occupied space is small. In addition, through the introduction of low-pass filters, the fluctuation of the current value sampled by the current sensor can be reduced, and the effect of time delay can be eliminated.

While embodiments of the present disclosure has been described in terms of what is presently considered to be the most practical and preferred embodiments, it is to be understood that other embodiments may be apparent to one of ordinary skill in the art upon review of the present disclosure. Accordingly, it is intended that the present disclosure covers any modifications and/or alterations so long as such modifications and/or alterations fall within the spirit and scope of the appended claims.

What is claimed is:

1. A current control device configured to control N power conversion unit(s), wherein N is an integer greater than or equal to 1, the N power conversion units being connected in parallel when N is greater than 1, each of the N power conversion unit(s) comprising a signal input terminal and a current-controlled output terminal electrically connected to an external circuit, the current control device comprising:
  a first current sensor coupled between the current-controlled output terminal and the external circuit, to sample a current flowing through the external circuit and to acquire a current sampling value; and
  an error compensator electrically connected to the N power conversion unit(s) and the first current sensor, wherein the error compensator receives the current sampling value and a current reference value and generates a compensation value accordingly, and wherein the error compensator outputs N current command(s) to the N power conversion unit(s) respectively according to the current reference value and the compensation value,
  wherein the error compensator comprises a compensation unit and a calculation unit, the compensation unit generates the compensation value according to the current sampling value and the current reference value, and wherein the calculation unit outputs the N current command(s) to the N power conversion unit(s) according to the current reference value and the compensation value.

2. The current control device according to claim 1, wherein N is greater than 1, and a sum of the N current commands is equal to a sum of the current reference value and the compensation value.

3. The current control device according to claim 2, wherein the N current commands are equal.

4. The current control device according to claim 1, wherein the compensation unit performs a subtraction operation to the current sampling value and the current reference value to acquire a current error, and wherein the compensation unit generates the compensation value by regulating the current error and limiting compensation amplitude.

5. The current control device according to claim 1, wherein the calculation unit adds the compensation value to the current reference value to obtain a sum, wherein the current command equals the sum when N equals 1, and the calculation unit divides the sum into the N current commands when N is greater than 1.

6. The current control device according to claim 1, wherein the error compensator further comprises a first low-pass filter and a second low-pass filter, the first low-pass filter being coupled between the first current sensor and the compensation unit to receive and filter the current sampling value and outputting the filtered current sampling value to the compensation unit, the second low-pass filter being coupled to the compensation unit to receive and filter the current reference value and outputting the filtered current reference value to the compensation unit.

7. The current control device according to claim 6, wherein a time delay of the second low-pass filter is substantially equal to a sum of time delays of the power conversion unit, the first current sensor, and the first low-pass filter.

8. The current control device according to claim 1, wherein the power conversion unit is one of a DC/DC converter, an AC/AC converter, and a DC/AC converter.

9. The current control device according to claim 1, wherein the power conversion unit comprises a second current sensor configured to detect a current flowing through the corresponding power conversion unit, and a sampling accuracy of the second current sensor is lower than a sampling accuracy of the first current sensor.

10. The current control device according to claim 1, wherein the external circuit is one of a load and a power source.

11. A power conversion system, comprising:
  a power grid, an inverter, and N power conversion unit(s) connected to each other, wherein N is an integer greater than or equal to 1, the N power conversion units being connected in parallel when N is greater than 1, each of the N power conversion unit(s) comprising a signal input terminal and a current-controlled output terminal electrically connected to an external circuit; and
  a current control device configured to provide current command(s) to the N power conversion unit(s) for controlling current(s) flowing through the N power conversion unit(s), wherein the current control device comprises:
  a first current sensor coupled between the current-controlled output terminal and the external circuit, to sample a current flowing through the external circuit and to acquire a current sampling value; and
  an error compensator electrically connected to the N power conversion unit(s) and the first current sensor, wherein the error compensator receives the current sampling value and a current reference value and generates a compensation value accordingly, and wherein the error compensator outputs N current command(s) to the N power conversion unit(s) respectively according to the current reference value and the compensation value,
  wherein the error compensator comprises a compensation unit and a calculation unit, the compensation unit generates the compensation value according to the current sampling value and the current reference value, and wherein the calculation unit outputs the N current command(s) to the N power conversion unit(s) according to the current reference value and the compensation value.

12. The power conversion system according to claim 11, wherein the error compensator of the current control device is disposed in a controller configured to control the N power conversion unit(s).

13. The power conversion system according to claim 11, comprising N external circuit(s) and N current control device(s), the N external circuit(s) being respectively electrically connected to the N power conversion unit(s), the N current control device(s) being respectively corresponding to the N power conversion unit(s), the error compensator of each of the N current control device(s) being disposed in the corresponding power conversion unit, and the first current sensor of each of the N current control device(s) being configured to detect a current flowing through the corresponding external circuit.

14. The power conversion system according to claim 11, wherein the external circuit is one of a battery and a power generator.

15. A current controller to control a power converter having a first terminal and a second terminal electrically connected to an external circuit, the current controller comprising:
 a first current sensor coupled between the second terminal and the external circuit to acquire a current sampling value associated with a current flowing through the external circuit; and
 an error compensator electrically connected to the power converter and the first current sensor, wherein the error compensator receives the current sampling value from the first current sensor and generates a compensation value based on the current sampling value and a current reference value, and wherein the error compensator outputs to the power converter a current command calculated based on the current reference value and the compensation value,
 wherein the error compensator comprises a compensation unit and a calculation unit, the compensation unit generates the compensation value according to the current sampling value and the current reference value, and wherein the calculation unit outputs the calculated current command to the power converter according to the current reference value and the compensation value.

16. The current controller of claim 15, wherein the error compensator further comprise:
 a first low-pass filter coupled between the first current sensor and the compensation unit, wherein the first low-pass filter receives and filters the current sampling value, and outputs the filtered current sampling value to the compensation unit; and
 a second low-pass filter coupled to the compensation unit, wherein the second low-pass filter receives and filters the current reference value, and outputs the filtered current reference value to the compensation unit.

17. The current controller of claim 15, wherein the power converter comprises a plurality of power conversion units connected in parallel between the first and second terminals, wherein the error compensator outputs a plurality of current commands respectively to the power conversion units, a sum of said plurality of current commands being equal to a sum of the current reference value and the compensation value.

18. The current controller of claim 15, wherein the power converter comprises a second current sensor to detect a current flowing through the power converter, a sampling accuracy of the second current sensor being lower than that of the first current sensor.

* * * * *